United States Patent [19]

Tull et al.

[11] Patent Number: 5,289,962
[45] Date of Patent: Mar. 1, 1994

[54] CUP HOLDER

[75] Inventors: Douglas P. Tull, Canton; John Vitkay, Livonia; Michael F. Wallis, Rochester Hills; Stephen E. Muzzell, Ferndale, all of Mich.

[73] Assignee: Chrysler Corporation, Highland Park, Mich.

[21] Appl. No.: 55,333

[22] Filed: May 3, 1993

[51] Int. Cl.⁵ .................... B60R 7/06; B65D 85/00
[52] U.S. Cl. .................. 224/273; 296/37.12; 211/71; 211/79; 211/81; 248/311.2; 224/275; 224/281; 224/282; 224/42.42; 224/42.43; 224/42.45 R
[58] Field of Search ............ 224/275, 281, 282, 42.42, 224/42.43, 42.44, 42.45 R; 211/80, 81, 79, 71; 248/311.2, 316.5, 316.4, 309.1; 296/37.12

[56] References Cited

U.S. PATENT DOCUMENTS

| | | | |
|---|---|---|---|
| 3,637,184 | 1/1972 | O'Brien | 248/311.2 X |
| 4,494,806 | 1/1985 | Williams et al. | 224/281 X |
| 4,852,843 | 8/1989 | Chandler | 248/311.2 |
| 4,953,771 | 9/1990 | Fischer et al. | 224/273 |
| 4,981,277 | 1/1991 | Elwell | 248/311.2 |
| 5,024,411 | 6/1991 | Elwell | 248/311.2 |
| 5,141,194 | 8/1992 | Burgess et al. | 248/311.2 |
| 5,171,061 | 12/1992 | Marcusen | 248/311.2 X |
| 5,190,259 | 3/1993 | Okazaki | 248/311.2 |

FOREIGN PATENT DOCUMENTS

92/10384  6/1992  PCT Int'l Appl. .................. 224/281

Primary Examiner—Ernest G. Cusick
Attorney, Agent, or Firm—Edward A. Craig

[57] ABSTRACT

A cup holder includes a platform adapted to radially pivot outward from an inclined vehicle structure such that the platform when fully extended in the outward position is substantially horizontal. The platform includes a front wall portion and rear wall portion, and a retaining member connected between the front and rear wall portions forms an upper horizontal surface. A pair of side walls pivotally connected to the platform cooperate with the retaining member and platform to form a cavity for holding a beverage container.

4 Claims, 4 Drawing Sheets

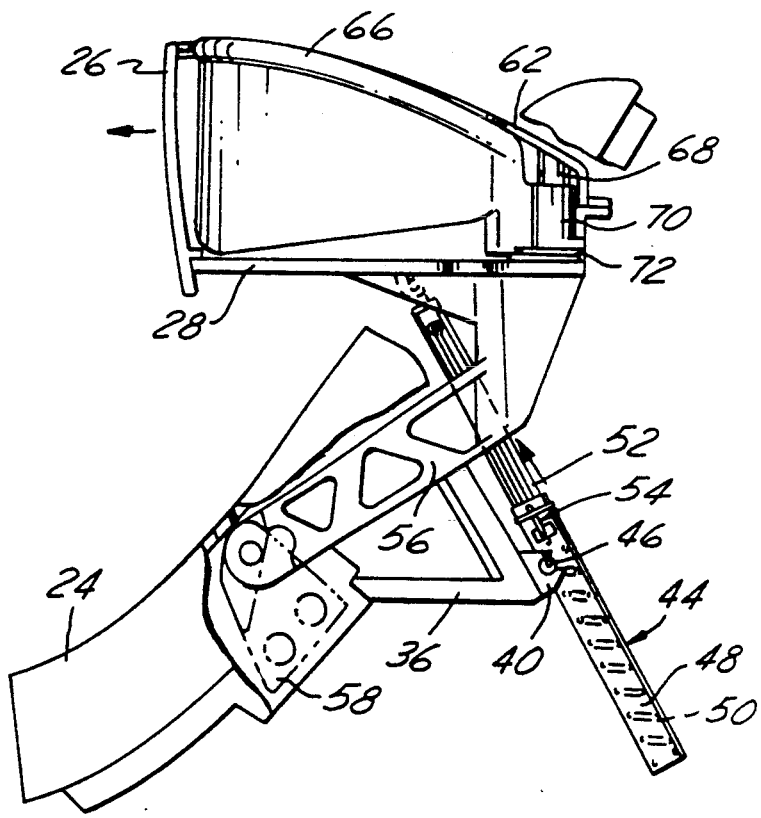
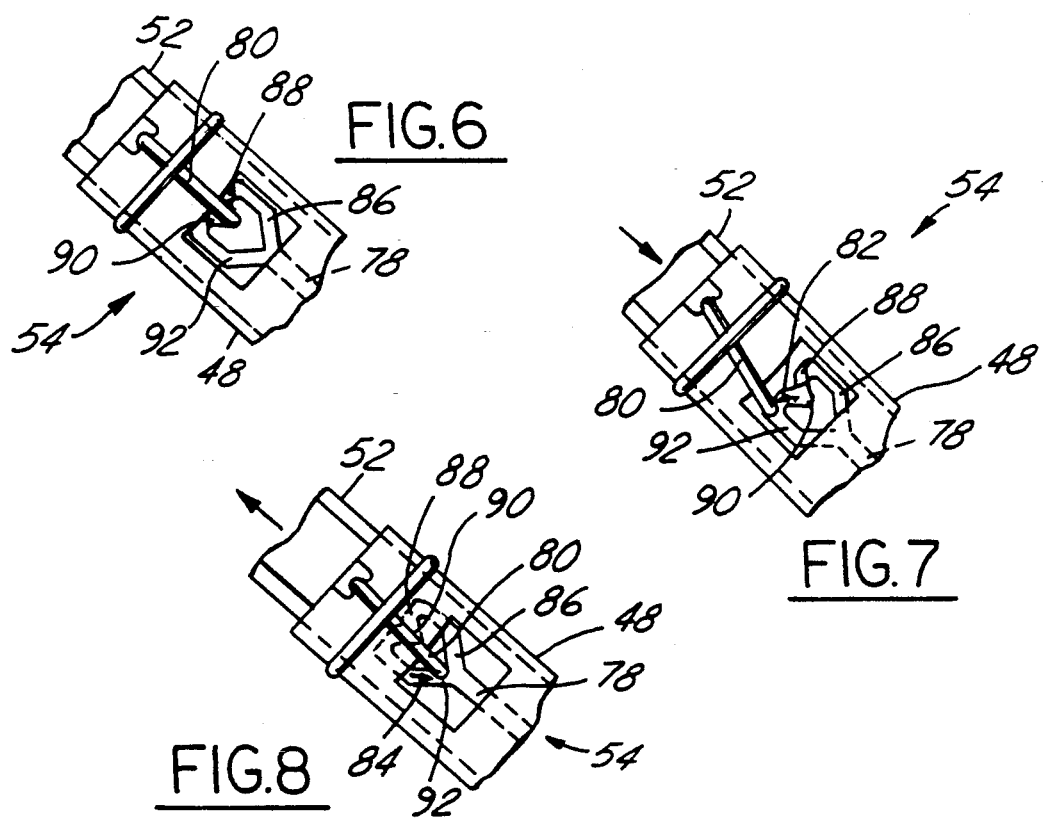

CUP HOLDER

BACKGROUND OF THE INVENTION

1. Field of the Invention

The present invention relates generally to cup holders and, more particularly, to a cup holder which is stored within vehicle structure.

2. Description of the Related Art

Currently, many automotive vehicle manufactures provide the interior of each vehicle with a cup holder for supporting a beverage container. The cup holder provides a place to secure a beverage container during vehicle operation. Typically, cup holders are either stationary platforms mounted horizontally with respect to the vehicle in open view, or they are retractable or hidden from view and pulled out when needed. Previously, cup holders have been coupled with ash trays, glove compartment doors, or simply formed as cylindrical cavities in a vehicle console.

One problem with retractable and hidden cup holders is that the cup holder must have a substantially horizontal cup platform or base in order to prevent spillage. To accomplish this, the cup holder must be mounted horizontally within the vehicle structure. Mounting the cup holder in this manner requires a greater use of interior space and limits the location on a vehicle at which the cup holder may be mounted. Additionally, retractable cup holders are usually manually operated; i.e., the vehicle operator must physically grasp and pull open the cup holder.

Since space is at a premium on an automotive vehicle, and today's automotive vehicles have many unique inclined, angular or curved surfaces, there is a need in the art to have a cup holder which may be mounted within vehicle structure at a position other than horizontal and ejected outward into the vehicle compartment into a horizontal position. When not in use, the cup holder may be closed by pushing the cup holder back into the vehicle structure, thereby providing a cup holder having both functional and aesthetic features.

SUMMARY OF THE INVENTION

It is, therefore, one object of the present invention to provide a unique cup holder which is hidden from view within a vehicle interior.

It is another object of the present invention to provide an ejection mechanism which ejects the cup holder outward into a use position within the vehicle interior.

It is yet another object of the present invention to provide a cup holder having a pivot mounting.

It is still another object of the present invention to provide a dampening mechanism which provides for a smooth and controlled ejection stroke by which the cup holder may be urged outward into the use position within the vehicle interior.

It is a further object of the present invention to provide a compact cup holder which folds up for storage to reduce the necessary storage space within the vehicle interior, wherein the cup holder expands to the proper size when ejected outward into the vehicle interior.

It is a still further object of the present invention to provide a cup holder which holds or accepts various size beverage containers while preventing noise and reducing potential spillage of the container contents.

To achieve the foregoing objects, the present invention is a cup holder for use in storing cups or various beverage containers in an automotive vehicle. The cup holder may be stored in a first, closed position wherein the cup holder is hidden from the operator's view within vehicle structure and a second, open position wherein the cup holder is ejected outward from the vehicle structure into a use position within the vehicle interior.

In general, the present invention includes a bracket attached to a vehicle console, a platform member pivotally attached to the vehicle console and a bias means connected between the bracket and the platform member for urging the platform member outward into the open position. A damping means is also used to control the stroke or outward motion of the platform member when the platform member is ejected outward into the vehicle interior.

One advantage of the present invention is that the cup holder is stored and hidden within vehicle structure such as a vehicle console. Another advantage of the present invention is that the cup holder facia or front plate is designed flush with the inclined or complex surface of the console rather than requiring a vertical front face as in conventional cup holder designs. Yet another advantage of the present invention is that the cup holder reduces the amount of storage space necessary within the interior portion of the vehicle console to store the cup holder when the cup holder is placed in the closed position without requiring the cup holder to be stored in a horizontal position. Still another advantage of the present invention is that the cup holder includes a pair of sidewall members pivotally mounted to the platform member wherein the sidewall members are urged outward by spring members against inwardly projecting tabs on the console to dampen the outward stroke of the platform member. A further advantage of the present invention that the sidewall members fold up when the cup holder is placed in the closed position, thereby further reducing storage space. A still further advantage of the present invention is that the cup holder includes a skirt mounted adjacent each cup holder opening, enabling the cup holder to accept and hold various cup sizes or beverage containers to prevent rattling or movement of the cups or beverage containers.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 5 is a fragmentary side view of the cup holder of FIG. 2.

FIG. 6 is a fragmentary side view of a plunger assembly of the cup holder of FIGS. 1 through 5, illustrating the plunger in a stationary position.

FIG. 7 is a view similar to FIG. 6 of the plunger assembly, illustrating the release stroke of the plunger.

FIG. 8 is a view similar to FIG. 6 of the plunger assembly, illustrating the outward ejection stroke of the plunger.

DESCRIPTION OF THE PREFERRED EMBODIMENT(S)

Figure 1:
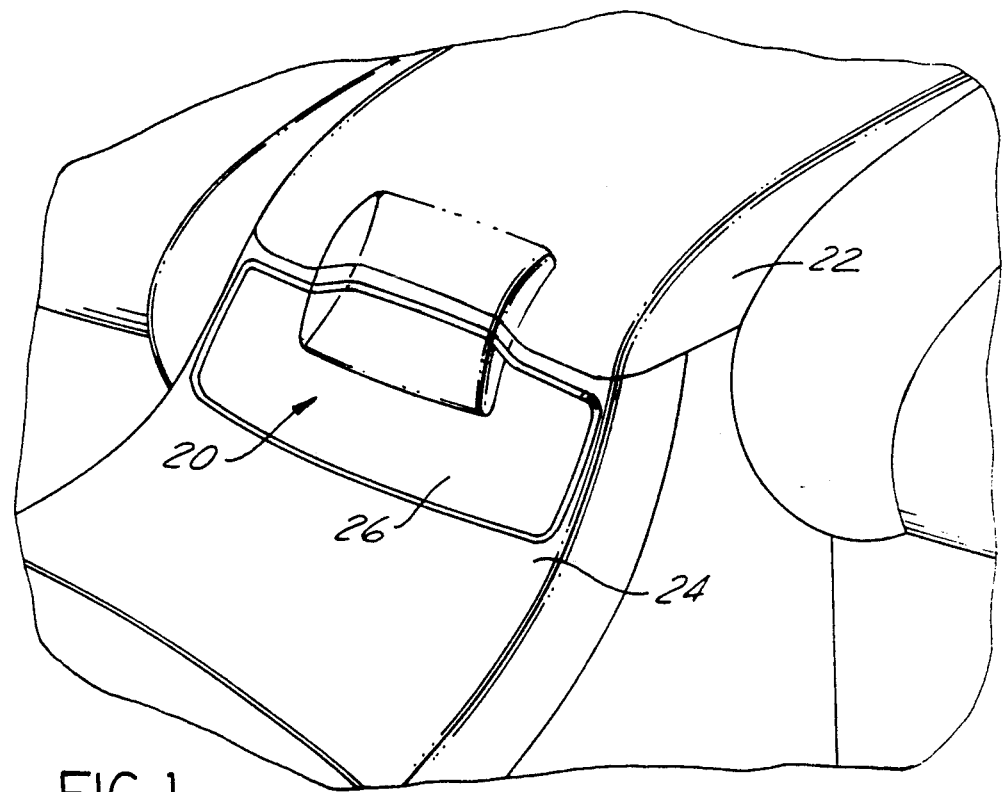
FIG. 1 is a perspective view of a cup holder, according to the present invention, illustrated in a closed position and in operational relationship to vehicle structure.
Figure 2:
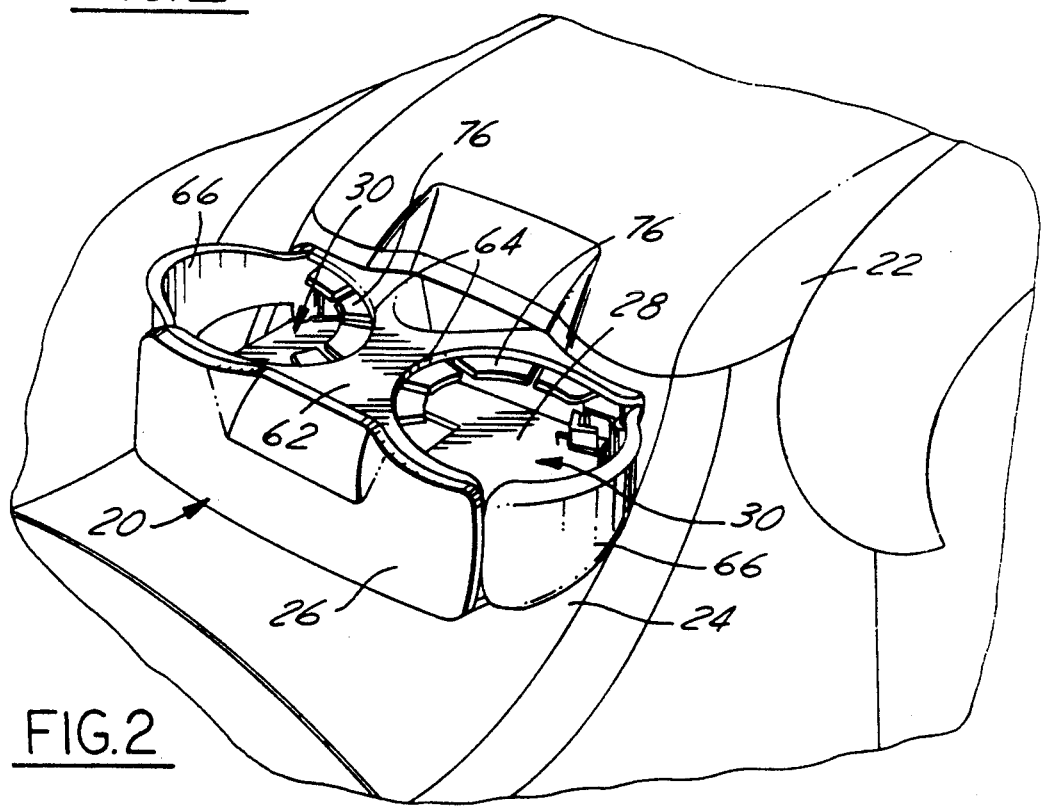
FIG. 2 is a view similar to FIG. 1 illustrating the cup holder in an open position.
Figure 3:
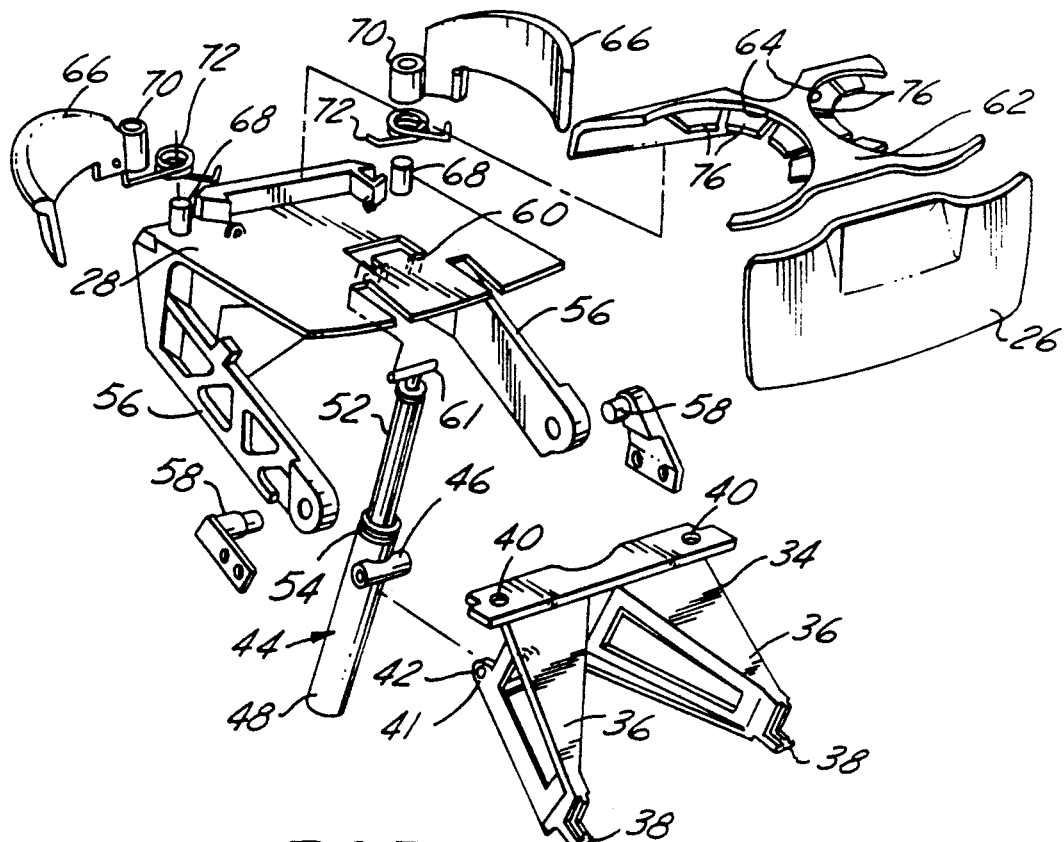
FIG. 3 is an exploded perspective view of the cup holder of FIGS. 1 and 2.

Referring to FIGS. 1 and 2, a cup holder 20, according to the present invention, is shown in a closed position on vehicle structure such as a vehicle console 22 of an automotive vehicle (not shown). The vehicle console 22 has an inclined facia surface 24 and, therefore, the cup holder 20 has a facia 26 with the same incline in order to provide a smooth and aesthetic appearance. As illustrated in FIG. 2, the cup holder 20, when in an open position, i.e. ejected outward from the vehicle console 22, has a platform 28 which is positioned substantially horizontal to prevent spillage from any cup or beverage container placed in a holding cavity, generally indicated at 30, of the cup holder 20. Referring to FIG. 3, the cup holder 20 includes a bracket 34 suitable for mounting to an interior surface 35 of the vehicle console 22. The bracket 34 includes a pair of triangular shaped leg members 36 having locating and attachment projections 38 on one end thereof. The locating and attachment projections 38 fit in complementary slots (not shown) on the interior surface 35 of the vehicle console 22. The upper end of the bracket 34 is secured to the interior surface 35 of the vehicle console 22 by suitable means such as threaded fasteners (not shown) extending through a flange (not shown) on the interior surface 35 of the vehicle console 22 and threadably received within apertures 40 on the bracket 34. The bracket 38 also includes several ear members 41 having apertures 42 therein. It should be appreciated that the bracket 34 remains stationary relative to the vehicle console 22. The cup holder 20 includes a plunger mechanism, generally indicated at 44, having an elongated pin member 46 positioned transverse to a housing 48 of the plunger mechanism 44. The plunger mechanism 44 is pivotally connected to the bracket 34 by a placing the pin member 46 through the apertures 42 on the bracket 34. The plunger mechanism 44 also includes a compression spring 50 (FIG. 4) disposed within the housing 48 and a rod member 52 telescopingly disposed within the housing 48 and urged outwardly by the spring 50. The plunger mechanism 44 further includes a latch and release mechanism, generally indicated at 54 and to be described, to lock and release the plunger mechanism 44.

Figure 4:
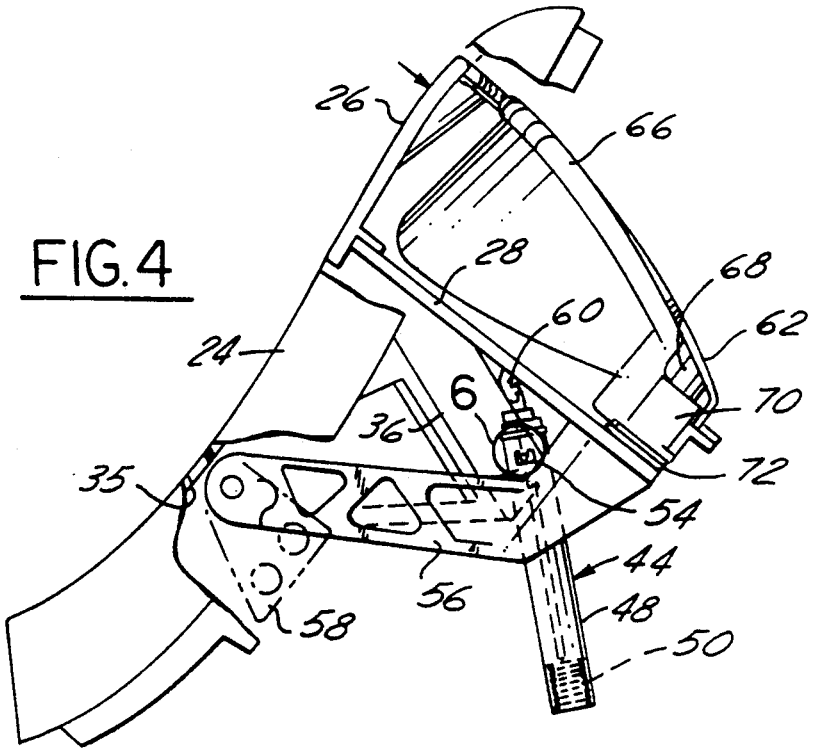
FIG. 4 is a fragmentary side view of the cup holder of FIG. 1.

The cup holder platform 28 includes a pair of downwardly depending inclined leg members 56. The leg members 56 are pivotally connected to a pair of pin members 58 secured by suitable means such as rivets (not shown) to the interior surface 35 of the vehicle console 22. It should be appreciated that the angle of the inclination of the leg members 56 depends on the angle of inclination of the surface 24 of the vehicle console 22. As illustrated in FIGS. 4 and 5, the cup holder platform 28 is pivotally connected through use of a snap-in-connector 60 which receives a transverse connecting pin 61 located on one end of the rod member 52. It should be appreciated that action of the rod member 52 pivots the cup holder platform 28 about the pin members 58 whereby the cup holder platform 28 is ejected outward of the vehicle console 22 in a radial sweep motion.

The holding cavity 30 is defined by a planer retainer member 62 having a pair of semi-circular openings 64. The retainer member 62 is attached to the platform 28 in a horizontally positioned spaced relationship and a pair of arcuate sidewall members 66 are pivotally connected to upright pivot pins 68 on the platform 28. The sidewall members 66 include an aperture or sleeve 70 on one end thereof to pivotally connect the sidewall members 66 to the pivot pins 68 and are outwardly biased by a pair of springs 72.

The holding cavity 30 provides a suitable support for preventing lateral movement of any cup or beverage container which is placed on the platform 28. Preferably, the facia 26 is attached to the retaining member 62 such that when the cup holder 20 is in a closed position, as illustrated in FIGS. 1 and 4, the facia 28 fits flush and provides a smooth and aesthetic surface with respect to the vehicle console 22.

Figure 9:
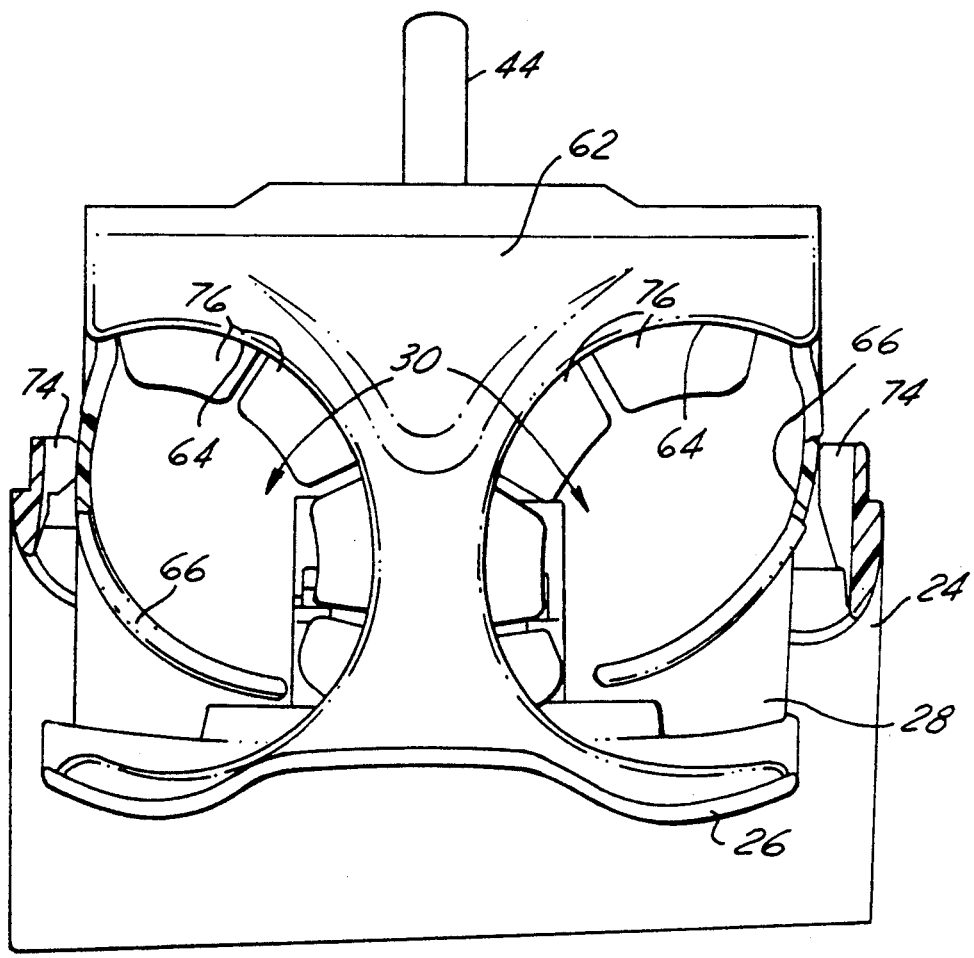
FIG. 9 is a fragmentary plan view of the cup holder of FIG. 1, illustrating the cup holder partially ejected from the vehicle structure.

Referring now to FIGS. 4 and 9, the cup holder 20 is illustrated in a closed position. When closed, the platform 28 is positioned at a substantial incline. The width of the sidewall members 66 which form the outside or sidewall portion of the holding cavity 30 is substantially reduced by tab members 74. The sidewall members 66 engage and are compressed by tab members 74 when the cup holder 20 is placed in the closed position as shown in FIG. 9. It should be appreciated that the platform 28 is ejected outward by the plunger mechanism 44 into a substantially horizontal, open position as illustrated in FIG. 5.

It should be appreciated that the sidewall members 66 are spring loaded such that they open as the cup holder 20 is ejected outward into the interior of the vehicle in a radial sweep motion. The tab members 74 also act as a damper to help dampen the plunger mechanism 44 which acts as the main damper resulting from air flow. The dampening force occurs due to the spring loading of the sidewall members 66. The bias force exerted by the spring 72 acts through the sidewall members 66 against the spring force of the plunger mechanism 44. The dampening effect is controlled by the force of the sidewall members 66 on the tabs 74; i.e. as the force increases the corresponding friction increases thereby reducing and controlling the rate at which the cup holder 20 is ejected outward into its open position.

The cup holder 20 also includes a rubber skirt 76 around the openings 64 of the holding cavity 30. The skirt 76 enables the cup holder 20 to accept and retain a wide variety of cups or beverage containers ranging from a standard 12 oz. can to a 20 oz. soft drink bottle. The skirt 76 acts as a cushion to prevent any lateral motion which could create noise due to rattling or spillage of liquid in the beverage container.

Referring now to FIGS. 6 through 8, the latch and release mechanism 54 for plunger mechanism 49 is shown. The rod member 52 includes an actuating track 78 having a defined shape and different levels. An L-shaped pin 80 having a leg member extending downward into the track 78 is confined in the track 78. The different levels of the track cause the pin 80 to follow a predetermined path along the track 78, as indicated by arrows 82, 84 illustrates direction of the pin 80 travel. It should be appreciated that as the pin 80 enters the first level 86 of the track 78 it rides up an inclined or ramped surface. The ramped surface forming the first level causing the pin 80 to track in the direction shown by the arrow 82. As the pin 80 reaches the upper end of the first level 86 of the track 78, it falls downward onto the second level 88 i.e., over a ledge and down into a recessed area. The spring 50 urges the pin 80 back into the U-shape channel or notch which forms the third level 90. When the pin 80 is positioned at a third level 90, the rod member 52 is fully depressed and in a locked position, and the cup holder 20 is in a closed position. Further depression of the rod member 52 i.e., to release the latch and release mechanism 54, causes the pin 80 to be deflected to the opposite side of the track 78 (FIG. 7) and to drop downward onto a fourth level 92 of the track 78 after which the spring 50 pushes the pin 80 along the track 78 as illustrated in FIG. 8. It should be appreciated that the track 78 is comprised of four separate levels 86, 88, 90, 92, each having a different depth to keep the pin 80 moving in the proper direction about the track 78 and providing a means by which the cup holder 20 may be locked in a closed position.

It should be appreciated that this latch and release mechanism 54 enables the vehicle operator to depress the cup holder 20 inward when in the closed position to release the latch and release mechanism 54 and allow the plunger mechanism 44 to urge the cup holder 20 outward in a radial sweep motion. When the vehicle operator no longer requires use of the cup holder 20, the vehicle operator simply pushes the cup holder 20 back into the console 22 to latch the plunger mechanism 44 and retain the cup holder 20 in a closed position.

Accordingly, the cup holder 20 is stored within the vehicle console 22 until needed. The cup holder 20 may be ejected outward in a radial sweep wherein the sidewall members 66 act to dampen the actuation of the plunger mechanism 44. Use of the radial sweep allows a greater design freedom enabling the cup holder 20 to be made in a modular design which results in a greatly reduced package size and which allows the facia 2 to be mounted substantial perpendicular to the platform 28. In addition, the use of a skirt 76 around the cup holder 20 allows the cup holder 20 to accept a wide variety of cups or beverage containers.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A cup holder for use with a vehicle, the cup holder mounted within a vehicle console for movement between a closed position within the vehicle console and an open position wherein the cup holder extends out of the vehicle console comprising:
   a bracket attached to the vehicle console;
   a platform pivotally attached to the vehicle console, said platform including a rear wall portion, and a front wall portion;
   a housing having a rod member outwardly biased and disposed within said housing, said housing connected to said bracket and said rod member connected to said platform;
   a retaining member forming an upper horizontal surface connected to said front wall and rear wall portions, said retaining member having a semi-circular recess in an edge thereof;
   an arcuate vertical side wall pivotally connected to said platform, said side wall and said retaining member forming a cavity for receipt of a beverage container; and
   a plurality of resilient members positioned adjacent the cavity such that various size beverage containers may be supported by said cup holder.

2. A cup holder mounted for movement comprising:
   a bracket attached to vehicle structure;
   a platform pivotally connected to the vehicle structure; and
   an actuation means interconnecting said bracket and said platform for moving said platform between a first, closed position wherein said platform is disposed within the vehicle structure and hidden from view and a second, open position wherein said platform is positioned outside of the vehicle structure;
   said actuation means comprising a housing and an outwardly biased rod member telescopingly disposed within said housing.

3. A cup holder as set forth in claim 2 wherein said rod member is pivotally connected to said platform and said housing is pivotally connected to said bracket.

4. A cup holder as set forth in claim 3 wherein said actuation means includes a latch and release mechanism including a L-shaped pin member disposed on said housing and cooperating with a track on said rod member.

* * * * *